(12) United States Patent
Chakraborty

(10) Patent No.: US 7,397,473 B2
(45) Date of Patent: Jul. 8, 2008

(54) GEOMETRY BASED SEARCH METHOD FOR 3D CAX/PDM REPOSITORIES

(75) Inventor: Tathagata Chakraborty, Mumbai (IN)

(73) Assignee: Geometric Ltd., Mumbai (IN)

( * ) Notice: Subject to any disclaimer, the term of this patent is extended or adjusted under 35 U.S.C. 154(b) by 382 days.

(21) Appl. No.: 11/182,757

(22) Filed: Jul. 18, 2005

(65) Prior Publication Data

US 2006/0012597 A1 Jan. 19, 2006

Related U.S. Application Data

(60) Provisional application No. 60/588,372, filed on Jul. 16, 2004.

(51) Int. Cl.
*G06T 15/00* (2006.01)
(52) U.S. Cl. ................. 345/419; 345/440; 382/190; 382/191
(58) Field of Classification Search ............ 345/419, 345/440; 382/190, 191
See application file for complete search history.

(56) References Cited

U.S. PATENT DOCUMENTS

| 6,278,464 | B1 * | 8/2001 | Kohavi et al. ............... 345/440 |
| 7,250,944 | B2 * | 7/2007 | Anderson et al. .......... 345/419 |

OTHER PUBLICATIONS

Rea et al; "Part-Sourcing In A Global Market"; Proceedings of ICeCE 2001; Sep. 2001; pp. 1-8.
Vranić; "3D Model Retrieval"; Computer Graphics and Image Processing (CGIP); Apr. 2001; pp. 1-2.
Ankherst et al; "3D Shape Histograms for Similarity Search and Classification in Spatial Databases"; Proc. 6th Int'l Symposium on Spatial Databases; Jul. 1999.
Osada et al; "Matching 3D Models with Shape Distributions"; Princeton University, Oct. 2003.
Ohbuchi e al; "Shape-Similarity Search of Three-Dimensional Models Using Parameterized Statistics"; Proceedings of the Pacific Graphics; Oct. 2002; pp. 1/10-10/10.
Hilaga et al; "Topology Matching for Fully Automatic Similarity Estimation of 3D Shapes"; ACM SIGGRAPH; Aug. 2001.
Elinson et al; "Feature-based Similarity Assessment of Solid Models", pp. 297-310, 1996.
Kazhdan et al; "A Reflective Symmetry Descriptor for 3D Models"; Princeton University; pp. 1-26, Oct. 2003.
Vranić et al; "3D Shape Descriptor Based on 3D Fourier Transform"; Institute of Computer Science, 2005.

(Continued)

*Primary Examiner*—Phu K. Nguyen
(74) *Attorney, Agent, or Firm*—Stites & Harbison PLLC; Ross F. Hunt, Jr.

(57) ABSTRACT

Traditional techniques of 3D data retrieval using names and subjective attributes are not robust and are difficult to automate over large 3D repositories. Certain techniques developed for search and classification of 2D engineering designs, are in general, difficult to extend to 3D models. These issues are addressed by a system for automated search and classification for 3D CAx models based on their geometric "shape," which is often an indication of design, analysis and manufacturing process similarity. A new method and system are provided for representing 3D shape as a composition of multiple 2D image projections, which are transformed using the Discrete Fourier and Harr Wavelet transforms. Key coefficients of the transforms are then stored in the 3D model repository and are used to efficiently search and classify such repositories.

17 Claims, 6 Drawing Sheets

OTHER PUBLICATIONS

Zaharia et al; "Shape=-based Retrieval of 3D Mesh Models", 2002, 437-440.

Funkhouser et al; "A Search Engine for 3D Models"; pp. 1-28, Jan. 2003.

Barber et al; "The Quickhull Algorithm for Convex Hulls"; ACM Transactions on Mathematical Software; vol. 22, No. 4; Dec. 1996; pp. 469-483.

* cited by examiner

GEOMETRY BASED SEARCH METHOD FOR 3D CAX/PDM REPOSITORIES

CROSS REFERENCE TO RELATED APPLICATIONS

This application claims priority of U.S. provisional application Ser. No. 60/588,372, filed Jul. 16, 2004, which is hereby incorporated by reference.

FIELD OF INVENTION

The present invention relates to a method and system for representing the geometry of a three dimensional (3D) model as a composition of multiple two dimensional (2D) hierarchical representations, and more particularly, to a system and method for determining the similarity in geometry between two 3D models.

BACKGROUND OF THE INVENTION

3D CAD/CAM/CAE (CAx) models are widely used by product development organizations. Most product development organizations have large databases or repositories of 3D models. These repositories necessarily archive the 3D shape or geometry of the 3D models. The repositories also usually archive related textual and multi-media data associated with the models.

Repositories for 3D models in a product development organization can rapidly grow in size over time as more and more 3D models get archived into the system. Larger repositories of 3D models necessarily require larger amounts of time and result in larger costs for maintenance. It is therefore important to keep the size of these repositories to the minimum required in order to save maintenance costs. Furthermore, an automated system for managing the repositories is necessary to save on maintenance time.

Traditionally, most product development organizations usually develop proprietary conventions for assigning unique names and subjective attributes to archived 3D models. These conventions are dictated by the needs of a particular business model and are based on a multitude of industry standard, software and vendor specific keywords. These names and attributes are stored in the repositories along with the 3D shape or geometry information. However, due to their inherent subjective nature these conventions are difficult to enforce across a large number of engineers and designers, and across different departments in the same organization.

Reuse of existing 3D shape and related data when developing a new product significantly decreases the time to market and cost for the product. Reuse is effective during all stages of the design-to-manufacturing cycle. Furthermore, where direct reuse of existing model is permitted, it also saves on maintenance costs related to storing duplicate models in a repository. However, browsing for and locating a reusable model in a large repository can be a tedious exercise, the cost of which sometimes exceeds the cost savings related to reuse. This is due to the fact that current CAx/PDM repositories only allow searching based on the model names and subjective attributes, and are thus lacking in robustness.

It is of interest to engineers and designers to have a method to quickly identify reusable models based directly on their 3D shape or geometry. This is because the 3D shape similarity between models is often an indication of design, analysis and manufacturing process similarity. A 3D shape based method can be used as a tool in conjunction with existing search systems available in CAx/PDM repositories, to quickly identify reusable models.

Prior art systems are available for 3D shape based searching. The key parameters for evaluating such shape based search methods are: (i) The ability to discriminate a model sufficiently among a large set of dissimilar models; (ii) Tolerance to relatively small changes that occur across similar models; (iii) Computationally inexpensive to derive and compare against many models. Much of the prior art has been concentrated on general and approximate methods, with less emphasis on application specific and accurate methods. Moreover, most prior art techniques do not meet the three said evaluation criteria. The prior art methods used can be broadly grouped into four categories—gross parameters, statistical measures, graph based methods and transform based methods.

Briefly considering the four generic categories, gross shape measures capture gross properties of the 3D model such as volume, surface area, moments, etc. Gross measures may also include certain domain specific information (like molecular weight, in 3D molecular databases). Several gross parameters ("crinkliness", "compactness" etc.) have been used in describing the shape and matching in the domain of CAD databases. (See Rea, J., Corney, J. R., Clark, D. E. R., Pritchard, J., Breaks, M. L., and MacLeod, R. A.: Part-Sourcing in a Global Market. Proceedings of ICeCE 2001. 2001 International Conference on eCommerce Engineering: New Challenges for Global Manufacturing in the 21st Century, Sep. 16-18, 2001. Xi'an, P. R. China.) The use of "feature vectors" and moments as gross parameters for 3D shape comparison have also been described. (See Vranic, D. V., and Saupe, D.: 3D Model Retrieval. In: Proceedings of the Spring Conference on Computer Graphics and its Applications (SCCG2000) (ed. Falcidieno, B.), Budmerice, Slovakia, May 2000, pp. 89-93.)

Gross parameters describe only a subset of the information comprising shape and related properties of 3D models. Therefore gross measures can be used effectively only in small sized databases where domain specific information can be leveraged. Gross parameters usually become too indiscriminating for repositories containing a large number of models.

Statistical shape measures capture the shape of a model by some form of sampling. Statistical shape histograms have been used for nearest neighbor search and classification in 3D molecular databases. (See Ankerst, M., Kastenmüller, G., Kriegel, H.-P., and Seidl, T.: 3D Shape Histograms for Similarity Search and Classification in Spatial Databases. In Proc. 6th International Symposium on Spatial Databases (SSD'99), Hong, Kong, China, July 1999.) Further, various forms of shape distributions for comparing 3D models, have also been analyzed. (See Osada, R., Funkhouser, T., Chazelle, B., and Dobkin, D.: Matching 3d models with shape distributions. International Conference on Shape Modeling and Applications. ACM SIGGRAPH, The Computer Graphics Society and EUROGRAPHICS, IEEE Computer Society Press, Genova, Italy, May 7-11 2001, pp. 154-166.) Another statistical 3D shape similarity measure has been described which is based on sampling of gross measures like moments, average surface distance and its variance along the principal axes of inertia; (See Ohbuchi, R., Otagiri, T., Ibato, M., and Takei, T.: Shape-Similarity Search of Three-Dimensional Models Using Parameterized Statistics. In the proceedings of the Pacific Graphics 2002, Beijing, China, October 2002, pp. 265-274.)

Statistical shape based methods are based on sampling a large number of sample measures, and are hence relatively expensive to compute in comparison to gross parameters. However, the major drawback of such statistical measures (as in the case of gross parameters) is that their discriminating power decreases rapidly with increase in the number of models in the repository. Moreover, as the complexity of the 3D model increases most statistical distributions tend towards some standard shaped distributions (like the normal distribution).

Graphs describe shape using some connectivity structure. Graph based methods have been used in case of 2D shape matching, in fields like character recognition and silhouette matching. In 3D, a method of matching 3D models has been developed using connected skeletal approximations called multi-resolution 'Reeb Graphs'. (See Hilaga, M., Shinagawa, Y., Kohmura, T., and Kunii, Tosiyasu L.: Topology matching for fully automatic similarity estimation of 3D shapes. In SIGGRAPH, ACM, ACM Press, New York, N.Y., USA, August 2001, pp. 203-212.) Further, various feature-graph based techniques have been developed using manufacturing features of CAD models and graph based heuristics for determining the similarity between different 3D CAD models. (See Elinson, A., Nau, D. S., and Regli, W. C.: Feature-based similarity assessment of solid models. In: Christoph Hoffman and Wim Bronsvoort (ed.): Fourth Symposium on Solid Modeling and Applications, pp. 297-310, New York, N.Y., USA, May 14-16 1997. ACM, ACM Press, Atlanta, Ga.)

Graph based methods in 3D (as against in 2D) involve steps which are computationally very expensive such as computing the 3D skeleton graph or extracting features for forming feature nodes in the feature graph. Moreover, adapting the graph based techniques for handling models with multiple bodies (with or without connectivity) and surface models is a non-trivial problem.

Transform based methods usually transform the 3D shape into alternative representations of reduced dimension in terms of certain key coefficients. This makes the 3D shape matching task much simpler (as in the case of gross parameters and statistical measures) and simultaneously minimizes the loss of shape information. Transform based methods are also relatively inexpensive to compute as compared to graph based methods.

Transforms based methods are usually applied on some approximation of the 3D model, like the voxel approximation. A voxellized representation allows various relatively fast and discrete mathematical transforms to be applied to the 3D model, which retain only the most important and relevant characteristics of shape information. The "Reflective Symmetry" transform and the "Spherical Harmonics" transform have been used directly on the voxellized representation of the 3D model. (See Kazhdan, M., Chazelle, B., Dobkin, D., Funkhouser, T. and Rusinkiewicz, S.: A reflective symmetry descriptor for 3D models. Algorithmica, Special Issue on Shape algorithmics. 2003, and Funkhouser, T., Min, P., Kazhdan M., Chen, J., Halderman, A., Dobkin, D., and Jacobs D.: A Search Engine for 3D Models. ACM Transactions on Graphics, 22(1), pp. 83-105, January 2003.) Further, the use of the "3D Discrete Fourier" transform on a voxellized representation of the 3D model has been proposed. (See Vranic, D. V., and Saupe, D.: 3D Shape Descriptor Based on 3D Fourier Transform. In: Proceedings of the EURASIP Conference on Digital Signal Processing for Multimedia Communications and Services (ECMCS 2001) (editor Fazekas, K.), Budapest, Hungary, September 2001, pp. 271-274.) The "3D Hough" transform has also been used as a 3D shape descriptor. (See Zaharia, T., and F. Preteux, F.: Shape-based retrieval of 3D mesh models. In Proc. 2002 IEEE International Conference on Multimedia and Expo (ICME'2002), Lausanne, Switzerland, August 2002.)

In most transform based techniques (as against other methods) it is necessary to make the 3D model invariant to affine transforms. Therefore, several of the transform based methods tend to neglect the phase information associated with the transform in order to achieve affine invariance. In contrast, some transform based methods perform a prior pose-estimation step to orient the 3D model into a canonical pose before applying the transforms.

In summary, while gross and statistical measures are invariant to affine transformations, these measures are usually too indiscriminating for large repositories of models. Graph based methods can be used to capture structural, topology or feature information in a model, but these methods are computationally very expensive for non-trivial models. In contrast, the availability of a large number of existing transform based techniques allows for encoding various forms of shape data efficiently.

SUMMARY OF THE INVENTION

In accordance with one aspect of the invention, there is provided a method and system for representing 3D shape as a composition of multiple 2D hierarchical representations, and a method and system for determining the similarity between two 3D shapes by comparing key coefficients of the corresponding 2D hierarchical representations. The system of the invention can be deployed as an integrated solution on various CAD modelers and PDM systems, thus enabling reuse of enterprisewide 3D CAD repositories. The method is CAD modeler independent and can accept data in raw formats including generic formats such as point-clouds and triangulated polygon-soups. Handling 3D model data at the point cloud level potentially allows the system of the invention to accept as input, data from a point-cloud generating device (like a 3D laser scanner setup or other digitizers).

As indicated above, the present invention addresses the problem of 3D shape based search primarily for CAx repositories. Analysis of sufficiently large, industrial CAD repositories reveals that an average industrial CAD model is usually much more complex than simple freeform 3D models, such as those found by crawling the web (see Funkhouser, T., Min, P., Kazhdan M., Chen, J., Halderman, A., Dobkin, D., and Jacobs D.: A Search Engine for 3D Models. ACM Transactions on Graphics, 22(1), pp. 83-105, January 2003.), and on which much of the prior art is based. Most of the current techniques available for 3D shape search are either too gross and indiscriminating or are too computationally intensive to be processed for CAx models. The failure of existing techniques to work fast and robustly on CAx repositories prompted the investigations that led to the method and system of the invention which enables the capture of key shape characteristics at a finer level of detail and at a reasonable computational cost.

In general, in accordance with another aspect thereof, the method and system of the invention are based on decomposing the 3D model into a set of 2D projections that are then compared using transform based techniques. It has been observed that a small set of 2D projections, of sufficiently high resolution, can capture many key characteristics of most 3D CAD models, thereby providing a robust as well as an efficient paradigm to compare their shapes. In preferred embodiments, the 2D image projections are derived from a voxellized representation of the model, which, in turn, is obtained from a set of uniformly scattered points on the surface of the model. Hence, as indicated above, the method is suitable for any raw form of data including triangulated polygon-soups or point-clouds. Transforms are used on the 2D projected images to capture certain characteristic shape features. This includes the Discrete Fourier Transform and the Harr Wavelet Transform. (These transforms are described in detail in many books on Digital Image Processing.) Moreover, in order to make the method invariant to affine transformations the PCA (Principal Component Analysis) method is preferably used.

In accordance with a further aspect of the invention, there is provided a computer-based method for comparing the geometry of a pair of three-dimensional models, wherein each of the three-dimensional models is comprised of a plurality of three-dimensional surfaces and surface approximations, said method comprising using a computer in carrying out the steps of:

computing a plurality of two-dimensional hierarchical representations for each of said three-dimensional models; and comparing selected coefficients of said corresponding two-dimensional hierarchical representations for said pair of said models to determine a value indicating the amount of geometrical difference between said pair of models.

Preferably, the three-dimensional models comprise at least one of parametric surfaces, polygonal facets, mesh approximations, and point-cloud approximations and combinations thereof from which at least one geometric or spatial property may be extracted from localized regions of said surfaces.

The step of computing said plurality of two-dimensional hierarchical representations preferably comprises computing two-dimensional transformations of a plurality of two-dimensional projections of each of said three-dimensional models on a plurality of finite sized two-dimensional planes.

Preferably, the step of computing said plurality of two-dimensional hierarchical representations, further comprises for each of said three-dimensional models:

fitting a three-dimensional grid on the three-dimensional model;

identifying a subset of grid cells comprising said three-dimensional grid intersecting with said plurality of surfaces and surface approximations;

associating with each identified grid cell a value derived from the geometrical or spatial properties of portions of the plurality of surfaces and surface approximations contained within, or neighboring, the identified grid cell;

projecting said values of said identified grid cells on a plurality of two-dimensional planes to create a plurality of two-dimensional grids; and applying a two-dimensional transform on each said two-dimensional grid and selecting a subset of the coefficients of said transform as a hierarchical two-dimensional representation. Advantageously, the fitting of a three-dimensional grid on the three-dimensional model comprises fitting a boundary box enclosing said three-dimensional model and uniformly subdividing along three axes of said bounding box to obtain an initial set of coarse grid cells. Preferably, prior to said fitting a bounding box enclosing said three-dimensional model, a plurality of rigid and non-rigid transformations are applied to said plurality of surfaces and surface approximations comprising the three-dimensional model to orient and scale said three-dimensional model invariantly in three-dimensional space.

In another preferred embodiment, the step of subdividing the interior of the said oriented bounding box further comprises recursively subdividing a subset of said initial set of grid cells into smaller grid cells for each grid cell which intersects with said plurality of surfaces and surface approximations, until a predefined minimum grid cell size is achieved.

In a further preferred embodiment, the step of identifying a subset of the grid cells comprising said three-dimensional grid and intersecting with said plurality of surfaces and surface approximations, comprises selecting from said three-dimensional grid all grid cells with a minimum grid cell size.

Preferably, the step of comparing corresponding two-dimensional hierarchical representations for said pair of models comprises comparing a subset of values comprising the hierarchical representations using a standard norm.

According to yet another aspect of the invention to which reference was made hereinbefore, there is provided a method for searching for three dimensional (3D) models with geometries similar to a given query 3D model, by comparing the geometry of at least one 3D model with that of the query 3D model, the method comprising the steps of:

decomposing the 3D models that are compared into a set of two dimensional (2D) projections;

computing 2D hierarchical transforms of said 2D projections; and comparing selected values of the 2D transforms for the models that are compared.

Preferably, the set of 2D projections are obtained by projecting a voxellized representation of the respective model, along a plurality of directions on a plurality of finite sized 2D planes. Advantageously, the voxellized representation is obtained from a point cloud approximation of the surface of the respective model, and each voxel enclosing at least one point of said point cloud is assigned a geometric or spatial property representative of the portion of the surface enclosed by the voxel. Preferably, the transforms are applied on the 2D projections and a subset of the values of said transforms are used to capture characteristic shape features. In a preferred implementation, the transforms include the Discrete Fourier Transform and the Harr Wavelet Transform.

In a preferred embodiment, the selected values of said 2D transforms are stored in a data storage device in order to prevent re-computation of said selected values during each search.

Preferably, prior to said decomposing the 3D models being compared into a set of 2D projections, the Principal Component Analysis method is used in orienting the respective models invariantly in 3D space.

In accordance with yet another aspect of the invention, there is provided a computer-readable medium having computer executable instructions stored thereon for execution by a computer for comparing the geometry of a pair of three-dimensional models, wherein each of the three-dimensional models is comprised of a plurality of three-dimensional surfaces and surface approximations, said instructions comprising the steps of:

computing a plurality of two-dimensional hierarchical representations for each of said three-dimensional models; and comparing selected coefficients of said corresponding two-dimensional hierarchical representations for said pair of said models to determine a value indicating the amount of geometrical difference between said pair of models.

According to a further aspect of the invention, there is provided a computer-based system for comparing the geometry of a pair of three-dimensional models, wherein each of the three-dimensional models is comprised of a plurality of three-dimensional surfaces and surface approximations, said system comprising:

a module for computing a plurality of two-dimensional hierarchical representations for each of said three-dimensional models; and a module for comparing selected coefficients of said corresponding two-dimensional hierarchical representations for said pair of said models to determine a value indicating the amount of geometrical difference between said pair of models.

Further features and advantages of the present invention will be set forth in, or apparent from, the detailed description of preferred embodiments thereof which follows.

DESCRIPTION OF THE PREFERRED EMBODIMENTS

The overall algorithm for finding the shape measures for a 3D CAx model using a preferred embodiment of the method of the invention may be set forth as follows:

Algorithm: Find shape measures for a CAx model
Input: A CAx model
Output: Set of measures that capture model shape
Procedure ShapeMeasure (Model M)
Tessellate the model into triangular facets
Generate point cloud approximation
Orient the model along its principal axis
Voxellize the point-cloud
Generate the 2D projections
Apply Fourier and Harr Wavelet Transforms.
End ShapeMeasure Considering the overall method of this preferred embodiment in somewhat more detail, as a pre-processing step, the CAx model is tessellated if necessary to extract the triangulated data. The model surface is then approximated using a dense and uniform point-cloud on which all further processing takes place. The number of points used in the point-cloud approximation is chosen so as to ensure that no gaps or holes are left in the voxellized representation. The model is then oriented to a canonical pose using a modified form of the PCA, which works directly on the point-cloud data. A voxellized representation is then derived trivially from point-cloud data. The voxels intersecting with the 3D model surface are next assigned some property inherent to the portion of the model surface contained within the voxel cube. The voxels are then projected along the X, Y and Z directions, to form three 2D depth-maps. Two transforms, viz., the DFT (Discrete Fourier Transform) and the DHWT (Discrete Harr Wavelet Transform) are then applied on these depth-maps to generate low-dimensional and hierarchical representations of the corresponding images. The details in each step will be described below.

Figure 1:
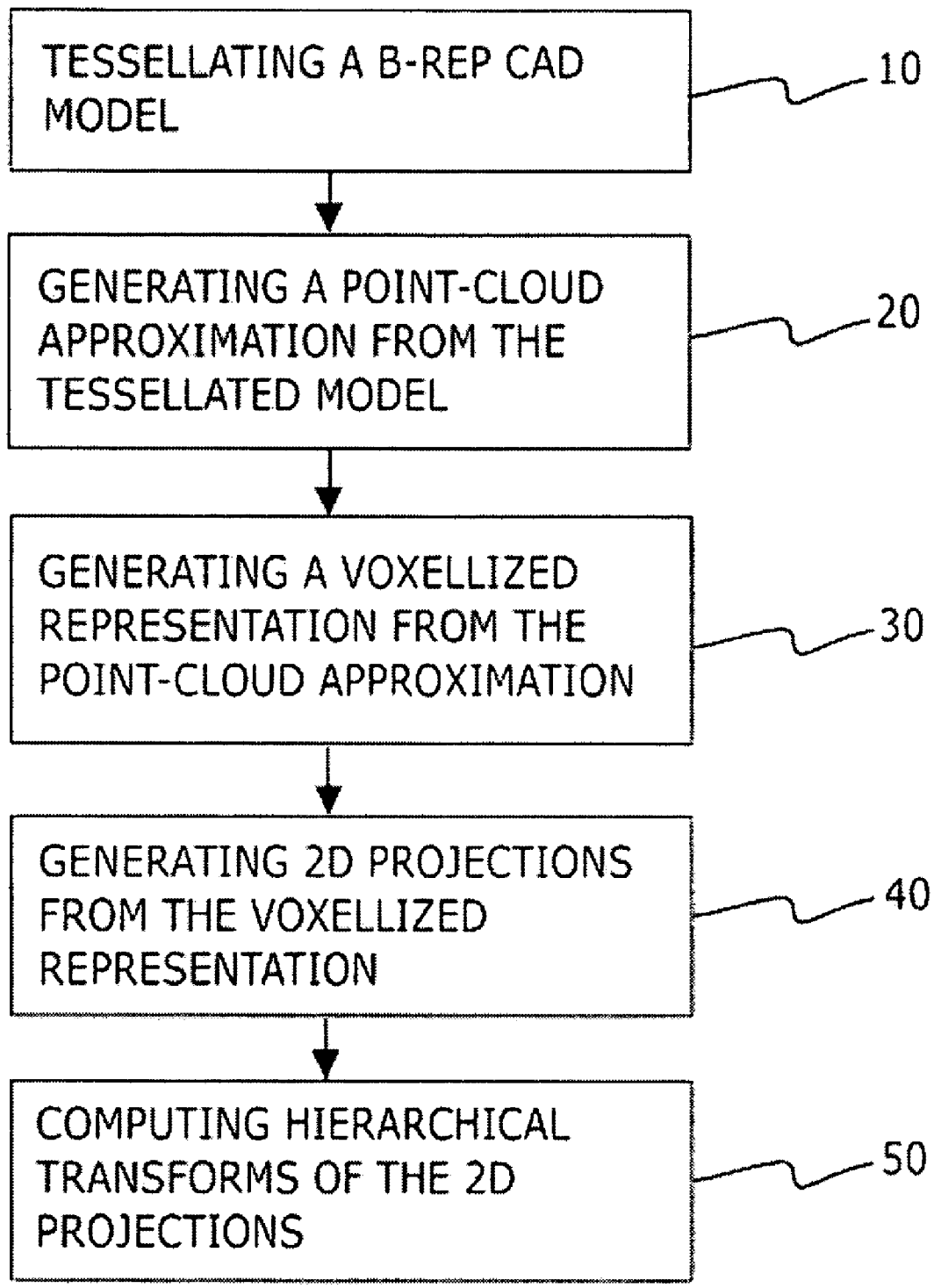
FIG. 1 is a flow chart of a preferred method for computing 2D hierarchical representations of 3D CAx models.

Referring to FIG. 1, a flow chart of a preferred method for computing the 2D hierarchical transforms from a given 3D CAx model is shown in more detail. The 3D model is first tessellated into triangular facets as indicated by step 10. As shown by step 20, next a point-cloud approximation of the 3D model is carried out. Thereafter a voxelized representation of the model is obtained from the point-cloud approximation (step 30). A set of 2D image projections is next obtained on a plurality of finite sized 2D planes as indicated by step 40. Hierarchical transforms are then applied on the 2D image projections to obtain the 2D hierarchical representations as shown by step 50.

CAD models are usually available as BRep/CSG models in proprietary formats. However, various CAD modelers can directly generate quality tessellation for these models. The triangulated data can easily be approximated using a dense and uniform point-cloud. A point-cloud approximation of the model surface (as compared with a faceted representation) enables the efficient implementation of some algorithms. The implementations of the PCA algorithm and the voxelization step employed in a preferred embodiment of the invention take advantage of such a representation.

Figure 3:
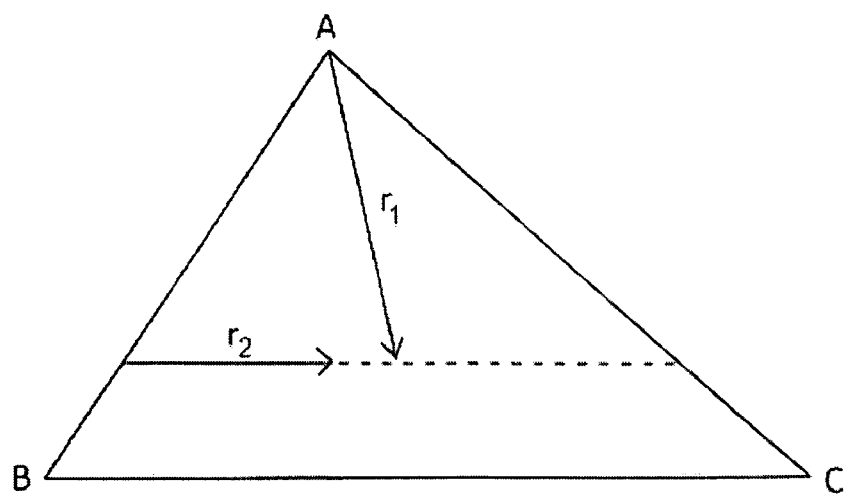
FIG. 3 illustrates a method for selecting a random point inside a triangle or triangular facet.

The number of points required to approximate the model surface should be sufficiently great, i.e., the point pattern should be sufficiently dense, so that no gaps or holes are left in the voxellized representation. Using a voxel resolution of N×N×N it has been empirically found that it is sufficient to use a number of points of the order of $N^3/2$. Each facet is sprinkled randomly with a number of points proportional to its area. The method of calculating a random point inside a triangular facet is adopted from Osada, R., Funkhouser, T., Chazelle, B., and Dobkin, D.: Matching 3d models with shape distributions. International Conference on Shape Modeling and Applications. ACM SIGGRAPH, The Computer Graphics Society and EUROGRAPHICS, IEEE Computer Society Press, Genova, Italy, May 7-11 2001, pp. 154-166, and is illustrated in FIG. 3. The random point on the facet is found from the equation:

$$P_R = (1-\sqrt{r_1})A + \sqrt{r_1}(1-r_2)B + \sqrt{r_1}r_2 C$$

where, $r_1$ and $r_2$ are two random numbers between 0 and 1, and A, B and C are the vertices of the triangular facet. Intuitively, $r_1$ sets the percentage distance of the random point from vertex A, while $r_2$ represents the percentage distance along a virtual edge parallel to the edge BC at a distance from vertex A as determined by $r_1$.

The preferred method used for pose-estimation is based on aligning the model along its principal axes using the PCA (Principal Component Analysis) method. In the preferred embodiment, the algorithm used is a variation of the "continuous" PCA method described by Vranic et al. (See Vranic, D. V., and Saupe, D.: 3D Shape Descriptor Based on 3D Fourier Transform. In: Proceedings of the EURASIP Conference on Digital Signal Processing for Multimedia Communications and Services (ECMCS 2001) (editor Fazekas, K.), Budapest, Hungary, September 2001, pp. 271-274.). The point-cloud input in the method of the invention enables the use of a fast discrete variation of the PCA that closely approximates the "continuous" PCA.

Figure 2:
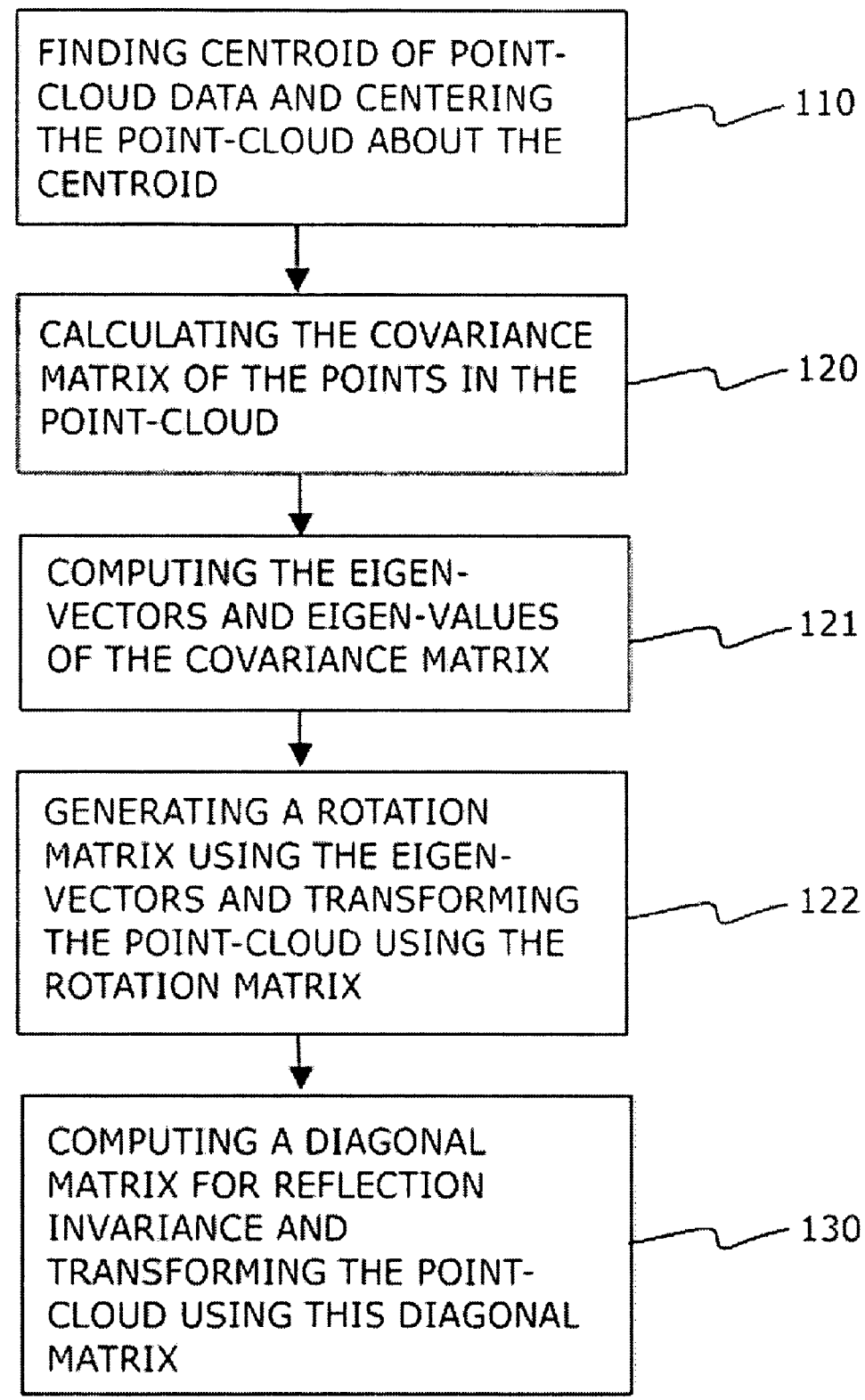
FIG. 2 is a flow chart of a preferred method for orienting a 3D CAx models invariantly in 3D space.

Referring now to FIG. 2, a flow chart of a preferred method for orienting a 3D model using the modified PCA algorithm is shown in detail. First, as indicated by step 100, the centroid of the point-cloud representation of the 3D model is computed and the point-cloud is centered about the centroid. Next the covariant matrix of the points in the point cloud is computed (step 120). Thereafter the eigen-values and eigen-vectors of the covariant matrix is computed as shown by step 121. A rotation matrix is generated using the eigen-vectors (step 122), and the points in the point-cloud are transformed using the rotation matrix. Finally, a diagonal matrix is computed for reflection invariance and the point-cloud is transformed using this diagonal matrix as indicated by step 130. The modified PCA algorithm is outlined below in further detail.

Let $P=\{p_1, \ldots, p_n\}(p_i=(x_i, y_i, z_i) \in R^3)$ be the set of points approximating the surface as a point-cloud. The goal is to find an affine map $\tau: R^3 \Rightarrow R^3$, such that for an arbitrary affine transformation $\sigma$, the equation $\tau(P)=\tau(\sigma(P))$ remains valid.

1. The translation invariance is achieved by first determining the center of gravity of the model c, $$c = \frac{1}{N}\sum_{i=1}^{N} p_i$$

and translating it to the origin. Generating the transformed set of points represented by, $$P'=\{p'_i | p'_i=p_i-c, p_i \in P\}$$

2. To achieve rotation invariance we first calculate the covariance matrix C (3×3) by $$C = \frac{1}{N}\sum_{i=1}^{N} p'_i p'^T_i$$

3. Matrix C is a real symmetric matrix with positive real eigenvalues. The eigenvectors are sorted by decreasing order of the corresponding eigenvalues, scaled to the Euclidean unit length, and the rotation matrix R is formed which has the scaled eigenvectors as rows. The point set P' is now transformed using this rotation matrix to generate a new point set $$P''=\{p''_i | p''_i=R \cdot p'_i, p'_i \in P'\}$$

4. The reflection invariance is obtained by transforming the point set P'' using the diagonal matrix $$F=\mathrm{diag}(\mathrm{sign}(f_x), \mathrm{sign}(f_y), \mathrm{sign}(f_z))$$

where $$f_x = \frac{1}{N}\sum_{i=1}^{N} p''^2_i(x)\mathrm{sign}(p''_i(x))$$

and analogously for $f_y$ and $f_z$.

5. Finally, the affine map T is defined to be $$\tau = F \cdot R \cdot (p-c)$$

Figure 4:
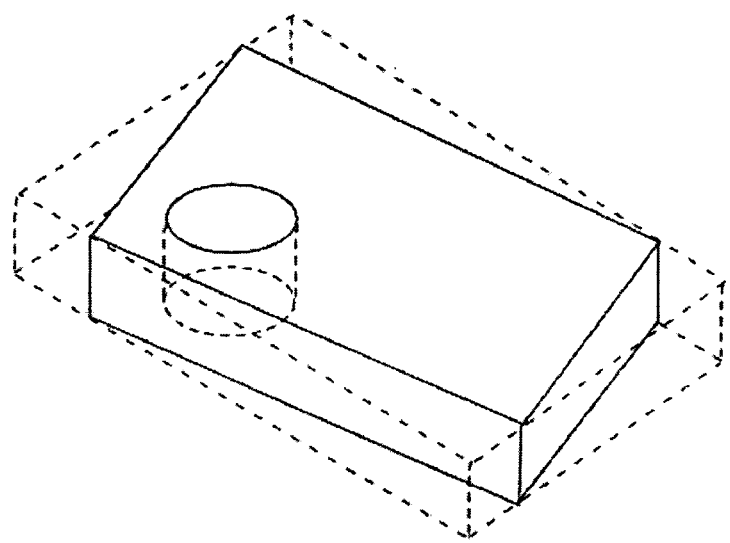
FIGS. 4 and 5 show representative model shapes that are encountered along with their axis aligned bounding boxes after orienting the model using PCA.

Certain problems have been associated with the use of PCA for pose-estimation see Funkhouser, T., Min, P., Kazhdan M., Chen, J., Halderman, A., Dobkin, D., and Jacobs D.: A Search Engine for 3D Models. ACM Transactions on Graphics, 22(1), pp. 83-105, January 2003), such as the multiplicity of eigenvalues and sensitivity to the presence of features. Multiplicity of eigenvalues occurs only in models with high symmetry such as the cube. However, feature changes are frequently seen in similar CAD models and it is important to make the PCA algorithm largely invariant to the presence of features. An example is shown in FIG. 4 wherein the internal pocket changes the principal axes of the solid model. To handle such cases, the PCA is done predominantly on the convex hull of the 3D model, based on the assumption that in most cases the internal features do not affect the pose of a model. It is noted that the convex hull of a set of points S in n dimensions is the intersection of all convex sets containing S.

The convex hull in 3D is preferably computed using the QuickHull algorithm in O(nlog(n)) time. (See Barber, C. B., Dobkin, David P., and Huhdanpaa, H.: The Quickhull Algorithm for Convex Hulls. ACM Transactions on Mathematical Software, 22(4), 1996, pp. 469-483.)

Figure 5:
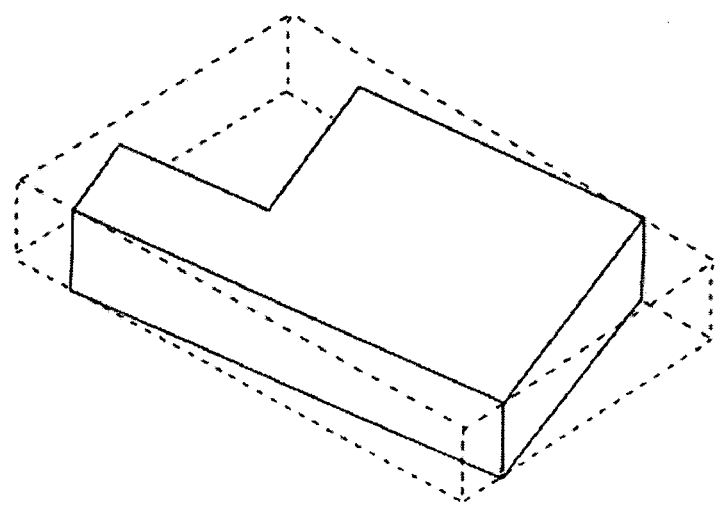

However, the above method does not solve issues related to the presence of outer features (such as those caused by antenna-like projections on the outer surface as shown in FIG. 5). Handling such outer shape changes robustly is a non-trivial problem; a complete solution of which requires several topology heuristics (like aligning along the average face normal) to be used in addition to the PCA. It is noted that in the domain of CAD models it may be unlikely that the models would be created so as to be arbitrarily oriented in space, and the step or option of orienting via PCA may be used only when required (i.e. on datasets known to contain models in arbitrary orientations).

Turning to 2D projections, after orienting the model, the 2D image projections are obtained along the principal axes, from the voxellized representation of the model. The voxellized representation is obtained trivially from the point-cloud data as explained below. Given the point cloud data, a sufficiently fine cubic grid is chosen and centered on the center of mass of the point cloud. In a preferred embodiment, all grid cells that intersect with the point cloud of the 3D model are assigned the value 1, while the remaining grid cells are assigned 0. However, it is to be noted that the grid cells may be assigned other values representative of the geometry or shape information of the subset of the points from the point cloud contained within the extents of the voxel or grid cell. Such geometry or shape information may, for example, comprise curvature information, surface normal variation etc.

An important parameter in the present method is the voxel resolution. In the experiments and implementations that have been carried out, a high-resolution (N=128) constant sized voxel grid was chosen across all models. In general it was found that increasing the voxel resolution increases the discrimination power of the algorithm, as more information is captured. The voxel resolution is meant to be tuned depending upon the database diversity and complexity.

The voxellized grid is projected along the three principal axes (as obtained from after applying PCA) to form three 2D image projections. In a preferred embodiment, the value at the projected pixel is determined by summing the position values of the surface voxels in the direction of projection. The position values are linearly weighed based on their distance from the projection plane. Such a scheme is adopted to capture the depth information additionally as part of the projected image. FIG. 5 illustrates the projection of one 2D slice of a very low-resolution 3D voxel data using the above technique.

Considering the 2D projected image transforms, the 2D projections are transformed using the Discrete Fourier and the Discrete Harr Wavelet transforms. The purpose of applying transformation is to encode important shape characteristics of the image.

Turning first to the 2D Discrete Fourier Transform, in the Fourier space each point (pixel) in the image represents a particular frequency contained in the real domain image. The image $I=\{x,y | 0 \leq x, y \leq N\}$ (assumed square in this case) is represented as a linear combination of complex exponentials, $$I(x, y) = \sum_N a_N \exp(i(\mu x + vy))$$

where the complex Fourier coefficients $a_N$ denote the magnitude and the direction in the frequency domain spanned by the frequency variables ($0 \leq \mu, v \leq N$). These coefficients are computed using the following equation, $$a_k = (2\pi)^{-2} \sum_N \sum_N \exp(-i(\mu x + vy)) I(x, y)$$

Being complex values, these coefficients are usually resolved into polar-complex form as amplitude and phase. Due to the hierarchical nature of the Fourier transform, the geometrical shape information is captured largely by the low frequency coefficients of the transform. In a preferred implementation, a small number of low-frequency coefficients (i.e. $-K \leq \mu, v \leq K$) are selected as the feature vectors, thus capturing the most important and defining features in the image. The application of the pose-estimation step using PCA enables the use of both the amplitude and phase information from the transform.

Figures 6, 7A, 7B, 7C:
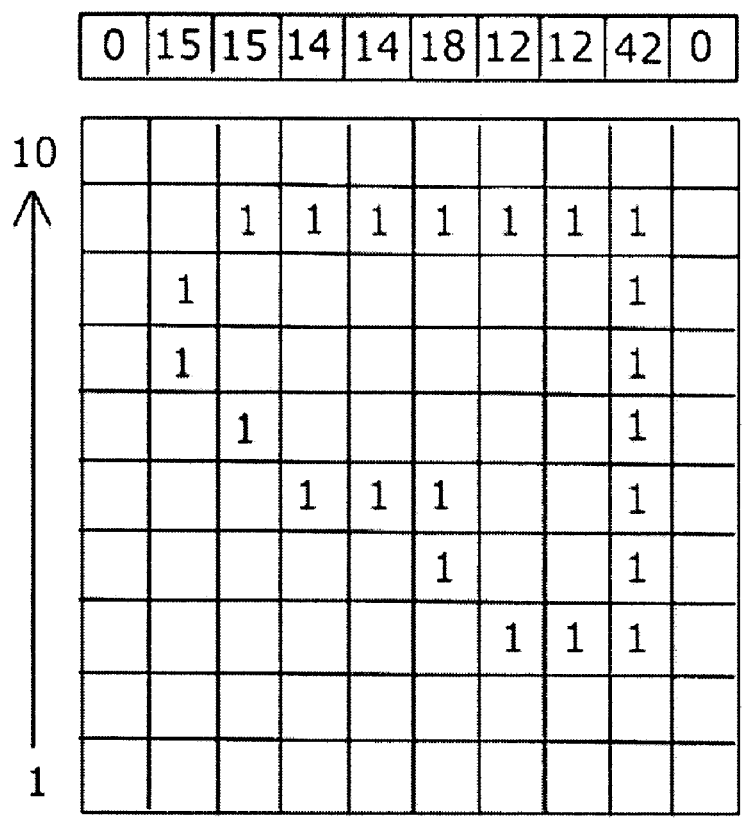
FIG. 6 illustrated the voxel projection technique for a 2D slice used in a preferred embodiment of the method of the invention.
FIGS. 7(a) to 7(c) illustrate a Harr Wavelet transform for a 2×2 window.

Considering the 2D Harr Wavelet transform, a wavelet representation of a function consists of an overall 'average' approximation along with the "difference" or "detail" coefficients. The Harr transform for a 2D matrix is generally calculated using a 2-step approach, by first executing the 1D transform on the rows, and then executing the 1D transform on the columns of the resulting image. A simple example of the Discrete Harr Wavelet Transform (DHWT) for a 2D (2×2) matrix is illustrated in FIG. 7. The first window shows the original input. The second window shows the result of applying the 1D DHWT on the rows of the original. $X_1Y_1$ now contains the average of $X_1Y_1$ and $X_2Y_1$, and similarly for the next row. The third window shows the results of applying the DHWT on the columns of the second window. $X_1Y_1$ now contains the average of $X_1Y_1$ and $X_1Y_2$, while $X_1Y_2$ contains the difference.

Figure 8A:
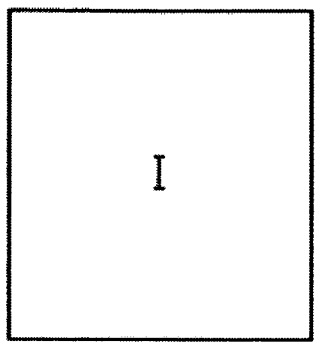
FIGS. 8(a) and 8(b) illustrate a Harr decomposition of a 2D image.
Figure 8B:
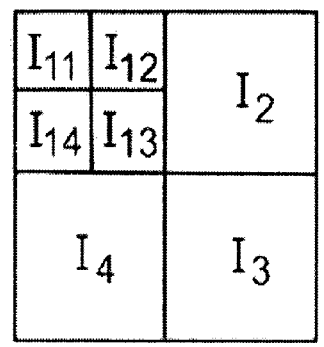

For a 2D square image I of resolution (N×N), it is decomposed into 2×2 windows, and the transformation is performed for each of the sub-windows as described above. The final coefficients from each of these individual transforms are grouped to form four (N/2)×(N/2) images (I1, I2, I3 and I4). Intuitively, this contains one low-pass sub-image (I1) containing the averages and three orientation selective high-pass sub-images (I2, I3 and I4) containing the difference coefficients. Only the low-pass sub-image (I1) are stored and high-pass images are ignored. The above step is repeated recursively on the low-pass sub-image (I1) to form higher-level wavelet decomposition (I11, I12, I13 and I14). FIG. 8 shows the application of the DHWT on a given a 2D image after two steps.

In a preferred implementation, $n^2$ coefficients from the lowest frequency band are stored. This comprises a hierarchical representation of the image that can be used for efficient comparison. Also wavelets capture not only the shape but also the texture of the images efficiently, and thus compliment the Fourier Transform. Moreover, the Harr Wavelet Transform can be computed quickly in linear time.

Considering now the system performance, a system in accordance with preferred embodiments of the invention has been tested rigorously over more than 35,000 industrial CAD models, obtained from various industrial sources. The test procedure included manual classification of a group of parts into similar groups and assessing the search results across these groups based on various statistical measures. The system was also tested for scalability on a database containing over 100,000 CAD models, created by merging multiple copies of the original database. In the discussion below, the search process is first outlined in brief. Next the variations of computational complexity and statistical measures are explained.

Considering the search process, given a query 3D model for search, its 2D image projections and transforms are computed. Going through the whole database and matching the transforms one-by-one, to retrieve the final result set, is not a scalable option. Therefore to efficiently identify a small set of likely results, iterative intersection queries are done on an increasing number of the first few coefficients of the transforms, until a small number of likely results are retrieved. This enables the system to achieve a controlled set of likely results and thus a controlled search time that scales sub-linearly with the number of models in the repository. For all the models within the retrieved set, the image transforms are then compared with the query to get a final set of results that pass a predetermined cutoff value. The standard L1 norm is used to compare the Fourier and Harr Wavelet transform values for two 3D models. The results are then ordered on the basis of the distance measures.

It is to be noted that, in order to speed up the search process the repository may be clustered prior to performing the search. Clustering is a one time activity of grouping similar models together based on a similarity measure. Incremental clustering is required when new models are added to the repository. In a preferred embodiment, the models in the repository are clustered using a single scan clustering algorithm, using as a basis the similarity measure employed in preferred embodiments of the method of the invention. The basic idea of a single scan algorithm is to group models in the repository into clusters based on a local similarity condition, thus performing only one scan through the models in the repository. The result is a single level partitioning or flat clustering of the repository into clusters. If the average runtime complexity of the sub-linear similarity search method used in the method of the invention is assumed to be approximately O(log n), then the overall runtime complexity of the single scan algorithm is only O(n log n). The algorithmic schema for the basic single scan clustering algorithm is as follows:

```
Procedure SingleScanClustering (Database D)
    For each object o in D do
        If o is not yet member of some cluster then
            Create a new cluster C
            While neighboring objects satisfy the cluster
            condition
                Add them to C
            End While
        End If
    End For
```

Considering the computational complexity of extracting the transforms from a 3D model, the steps of point-cloud approximation, pose-estimation using PCA, and voxellization are linear with respect to the number of points in the point-cloud. Further, the computational complexity of 2D image projection is linearly dependent on the voxel resolution. Since a preferred embodiment uses a fixed voxel resolution and a predetermined number of fixed points for the point-cloud approximation of the model, the 2D projection step has a constant time complexity. The complexity is therefore mainly governed by the convex hull algorithm which works in O(nlog(n)) time. It may be noted that although the convex hull algorithm could have been made to work on the point-cloud data, it would have added a constant but huge time factor to the overall computation time. The algorithm is, therefore, preferably adapted to work on the faceted data (if available). Further, as a preprocessing step, the connectivity for the faceted data is generated (if not available, in near $O(n\log(n))$ time using hash-tables) to prevent redundant vertex feeds to the convex hull algorithm.

Two other steps of higher computational complexity actually contribute small and constant time to the overall complexity. The eigenvalue computation (which preferably uses the Householde-QL algorithm) during PCA has a higher complexity of $O(n^3)$. However, this is computed on a small and constant sized 3×3 matrix. Similarly the computation of the Fourier coefficients requires $O(n\log(n))$, but again it is computed for a constant sized image data only.

Figure 9:
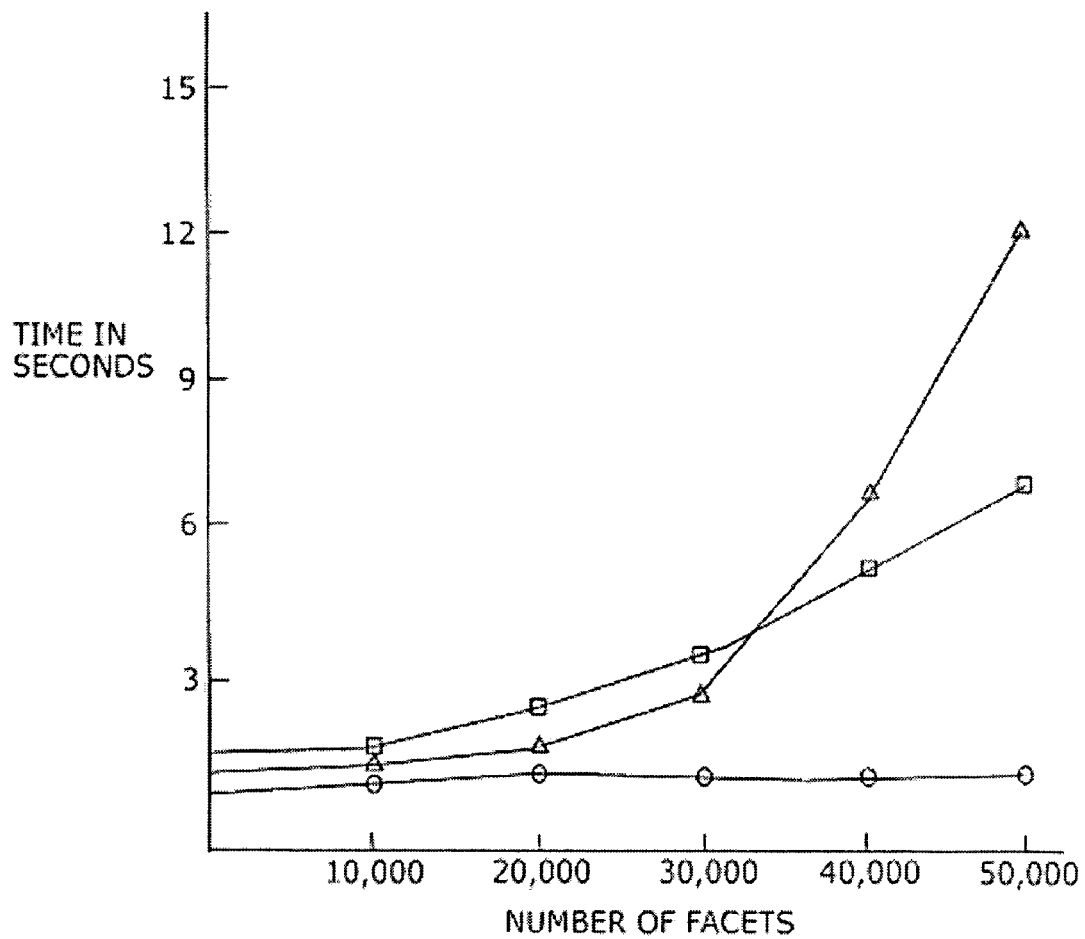
FIGS. 9 and 10 are graphs used in analyzing the performance of the method of the invention.

FIG. 9 shows the time taken for the computation of the connectivity, convex hull and the PCA, for the same model with increasing number of facets.

Statistical measures were developed to assess the quality of the results against manually classified families of similar parts. Around 3000 parts were classified into more than 250 groups of similar parts. Two important statistical measures were then sampled by experimentation:

Capability Index=$m_v/M_v$
Strength Index=$m_v/M_t$
where,
$m_v$=total number of valid results
$M_v$=total number of expected results
$M_t$=total number of results obtained Broadly speaking the capability index is a measure of the ability of the algorithm to bring in correct matches, whereas the strength index indicates the discriminating power of the algorithm. In prior art these terms are referred to equivalently as 'Recall' and 'Precision'. (See Funkhouser, T., Min, P., Kazhdan M., Chen, J., Halderman, A., Dobkin, D., and Jacobs D.: A Search Engine for 3D Models. ACM Transactions on Graphics, 22(1), pp. 83-105, January 2003.)

Figure 10:
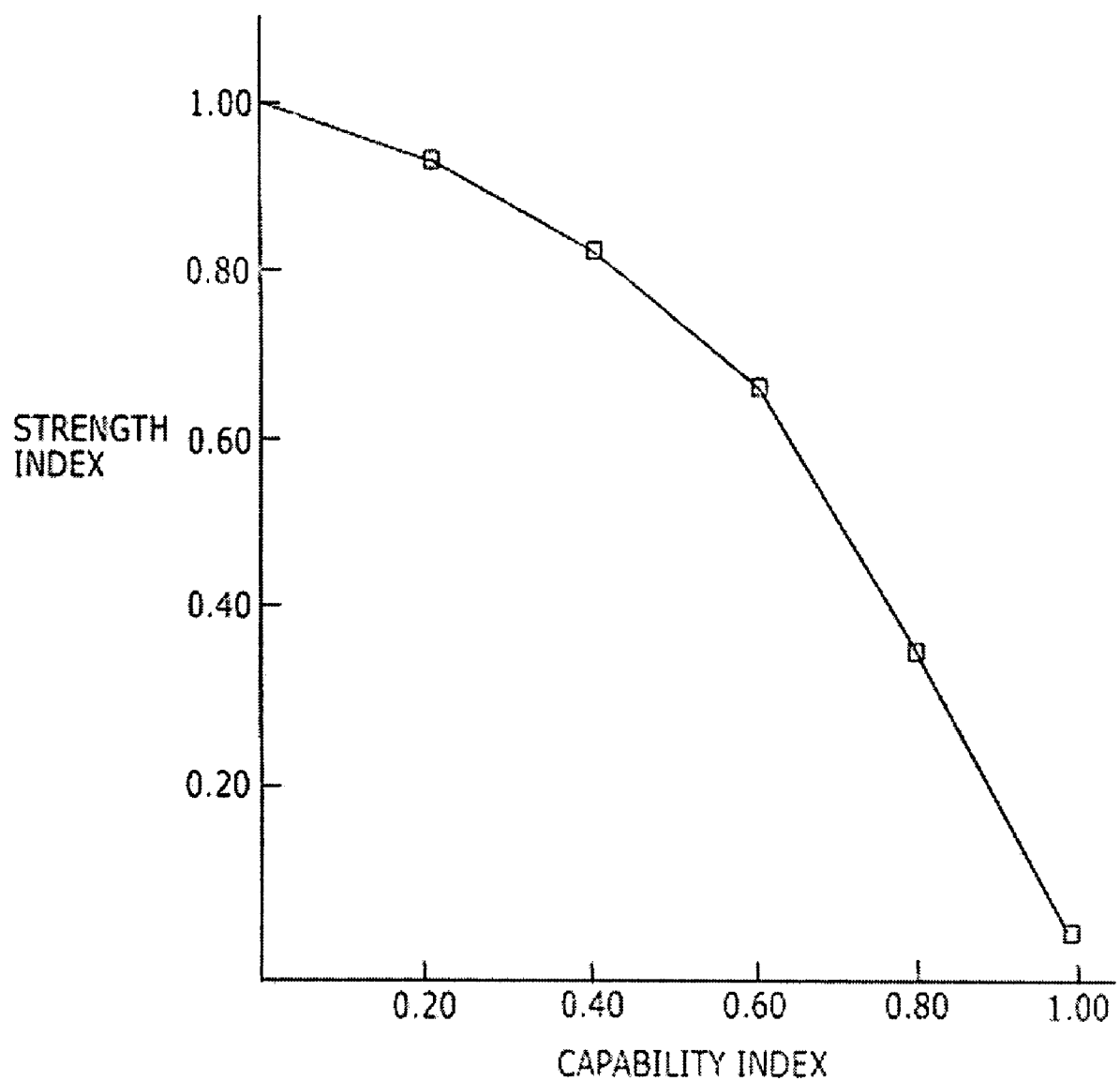

The lack of common measures and the difficulties of sharing a common test dataset from different researchers make accurate comparison of different algorithms difficult. FIG. 10 illustrates the general trend of the Precision versus Recall graph for the method of the invention. The ideal curve in this graph would be a horizontal line along the top of the plot. Otherwise, plots that appear shifted up and to the right indicate superior results.

As discussed above, the present invention concerns a new search method for shape similarity search in 3D CAx model repositories. The method has been empirically shown to be computationally fast and simultaneously robust in this application domain. Since the method is based on decomposing a 3D model into multiple 2D images, it can potentially leverage robust existing image matching techniques. Two relatively well-known transforms for matching the 2D projected images, and very encouraging results have been obtained. However, better techniques for matching the 2D projected images may be possible.

While the PCA algorithm for pose-estimation works relatively well, it is susceptible to large feature changes (especially outer shape changes) in CAD models. Also, CAD models usually have an inherently stable and natural orientation that is not always obtainable from the PCA. Such cases may be handled using topology heuristics in conjunction with the PCA. Better methods for orienting CAD models may also be possible.

The method of the invention uses a fairly high but constant voxel resolution. For complex models, even such a high resolution may not be sufficient, and for simplistic models it may not be optimal. A related problem is that of capturing small complex features in a model. Such problems can be solved by using adaptive voxellization techniques.

The basic approach here may also be useful in handling 3D assembly models. Assemblies are a large collection of 3D models connected via mechanical constraints, which allow certain degrees of freedom to the constituent models. The relatively large size and dynamic nature of assemblies makes it difficult to use current techniques for robust matching. However, the present method can be used to extract shape measures for individual components of the assembly. Simple relations between components in an assembly can also be stored in the repository. However, during the search process, these relations will need to be additionally verified for correct results.

Although the invention has been described above in relation to preferred embodiments thereof, it will be understood by those skilled in the art that variations and modifications can be effected in these preferred embodiments without departing from the scope and spirit of the invention.

What is claimed is:

1. A computer-based method for comparing the geometry of a pair of three-dimensional models, wherein each of the three-dimensional models is comprised of a plurality of three-dimensional surfaces and surface approximations, said method comprising using a computer in carrying out the steps of:

computing a discrete three-dimensional grid or voxel approximation for each of said three-dimensional models, computing a plurality of discrete two-dimensional projections or images from each of said discrete three-dimensional grid or voxel approximation;

computing a plurality of two-dimensional hierarchical representations for each of said discrete two-dimensional projections or images; and comparing selected values of said corresponding two-dimensional hierarchical representations for said pair of said models to determine a value indicating the amount of geometrical difference between said pair of models.

2. A method as claimed in claim 1, wherein said three-dimensional surfaces and surface approximations comprising the three-dimensional models comprise at least one of parametric surfaces, polygonal facets, mesh approximations, and point-cloud approximations and combinations thereof from which at least one geometric or spatial property may be extracted from localized regions of said surfaces.

3. A method as claimed in claim 1, wherein the step of computing said plurality of two-dimensional hierarchical representations, comprises for each said discrete two-dimensional projection or image:

computing two-dimensional transformations of said discrete two-dimensional projection or image; and selecting a subset of the values of said transform as a hierarchical two-dimensional representation.

4. A method as claimed in claim 1, wherein the comparing step comprises comparing a subset of values comprising the hierarchical representations using a standard norm.

5. A method as claimed in claim 1, wherein the step of computing said discrete three-dimensional grid or voxel approximations for each of said three-dimensional models comprises, for each of said three-dimensional models:

fitting a three-dimensional grid on the three-dimensional model;

identifying a subset of the grid cells comprising said three-dimensional grid and intersecting with the said plurality of surfaces and surface-approximations comprising the three-dimensional model; and associating with each said identified grid cell a value derived from the geometrical or spatial properties of portions of the plurality of surfaces and surface approximations contained within, or neighboring on, the said identified grid cell.

6. A method as claimed in claim 5, wherein said fitting of a three-dimensional grid on the three-dimensional model comprises fitting a bounding box enclosing said three-dimensional model and uniformly subdividing the interior of said bounding box along three axes of said bounding box to obtain an initial set of coarse grid cells.

7. A method as claimed in claim 6, wherein, prior to said fitting a bounding box enclosing said three-dimensional model, a plurality of rigid and non-rigid transformations are applied to said plurality of surfaces and surface approximations comprising the three-dimensional model to orient and scale said three-dimensional model invariantly in three-dimensional space.

8. A method as claimed in claim 6, wherein the step of subdividing the interior of the said oriented bounding box further comprises recursively subdividing a subset of said initial set of coarse grid cells into smaller grid cells for each grid cell which intersects with said plurality of surfaces and surface approximations, until a predefined minimum grid cell size is achieved.

9. A method as claimed in claim 5, wherein the step of identifying a subset of the grid cells, comprising said three-dimensional grid and intersecting with said plurality of surfaces and surface approximations, comprises selecting from said three-dimensional grid all grid cells with a minimum grid cell size.

10. A method as claimed in claim 1, wherein the step of computing said plurality of discrete two-dimensional projections or images from each said discrete three-dimensional grid or voxel approximation, comprises, for each of said discrete three-dimensional grid or voxel approximations, projecting a subset of the grid cells comprising said discrete three-dimensional grid or voxel approximation on a plurality of two-dimensional planes to create a plurality of discrete two-dimensional projections or images.

11. A method for searching for three dimensional models with geometries similar to a given query three-dimensional model, by comparing the geometry of at least one three-dimensional model with that of the query three-dimensional model, said method comprising the steps of:

computing a three-dimensional grid or voxel approximation of the said three-dimensional models;

computing a plurality of two-dimensional projections or images from each said three-dimensional grid or voxel approximation;

computing two-dimensional hierarchical transforms of each of said two-dimensional projections or images; and comparing selected values of the two-dimensional hierarchical transforms for said pair of said models to determine a value indicating the amount of geometrical difference between said pair of models.

12. A method as claimed in claim 11 wherein the three-dimensional grid or voxel approximation is obtained from a point cloud approximation of the surface of the respective model, with each three-dimensional grid cell or voxel enclosing at least one point of said point cloud approximation and being assigned a geometric or spatial property representative of the portion of the surface enclosed by the voxel.

13. A method as claimed in claim 12 wherein transforms are applied on the two-dimensional projections and a subset of the values of said transforms are used to capture characteristic shape features.

14. A method as claimed in claim 13 wherein said transforms include the Discrete Fourier Transform and the Harr Wavelet Transform.

15. A method as claimed in claim 11, wherein said selected values of said two-dimensional transforms are stored in a data storage device in order to prevent re-computation of said selected values during each search.

16. A method as claimed in claim 11 wherein, prior to said decomposing of the three-dimensional models that are compared into a set of two-dimensional projections, the Principal Component Analysis method is used in orienting the respective models invariantly in three-dimensional space.

17. A computer-readable medium having computer executable instructions stored thereon for execution by a computer for comparing the geometry of a pair of three-dimensional models, wherein each of the three-dimensional models is comprised of a plurality of three-dimensional surfaces and surface approximations, said instructions comprising the steps of:

computing a three-dimensional grid or voxel approximation of the said three-dimensional models;

computing a plurality of two-dimensional projections or images from each said three-dimensional grid or voxel approximation;

computing a plurality of two-dimensional hierarchical representations for each of said two-dimensional models projections or images; and comparing selected coefficients of said corresponding two-dimensional hierarchical representations for said pair of said models to determine a value indicating the amount of geometrical difference between said pair of models.

* * * * *